Nov. 15, 1955　　P. J. McCULLOUGH　　2,724,039
ELECTRIC HEATER STRUCTURE
Filed May 3, 1952
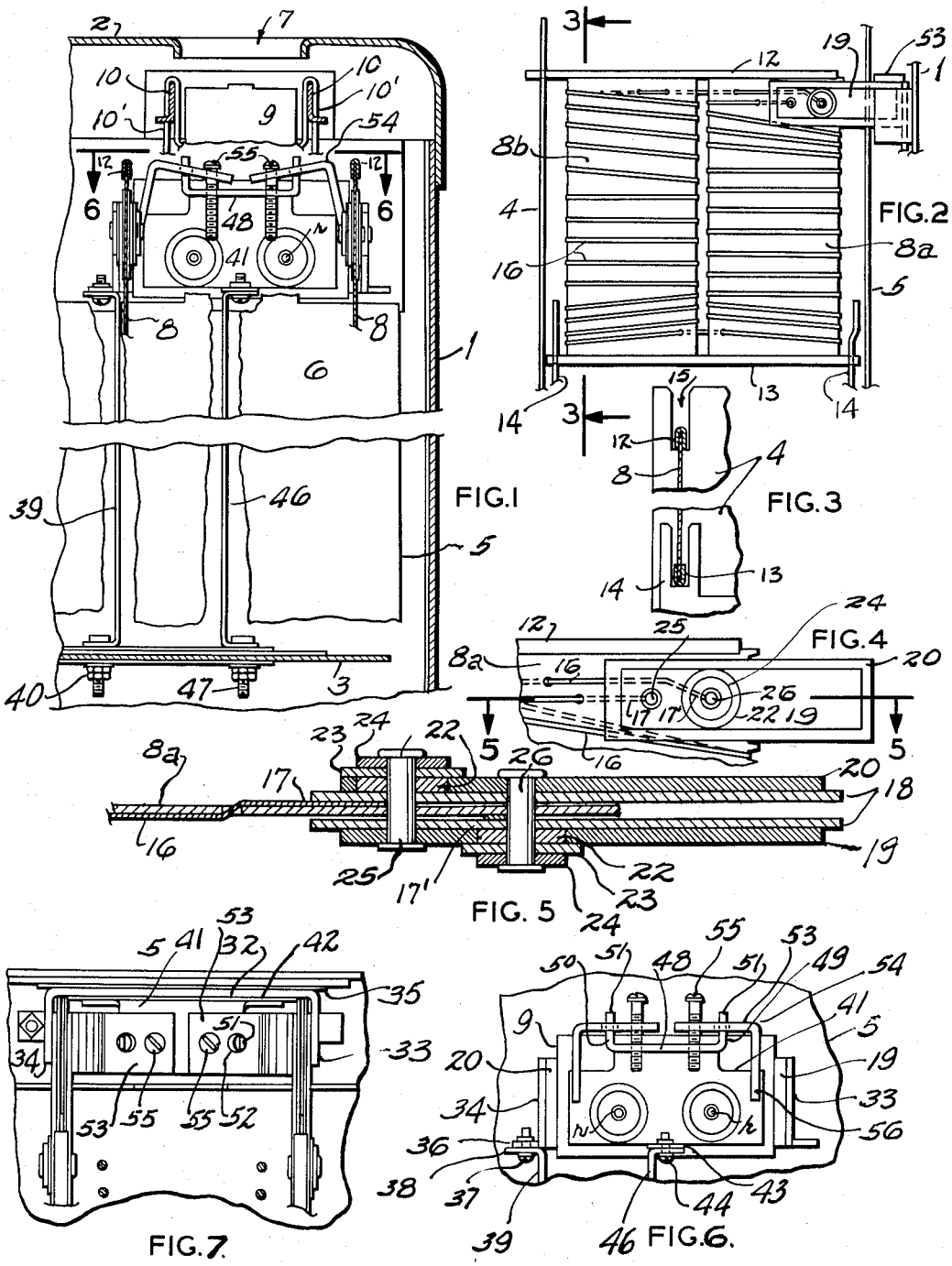
INVENTOR.
Paul J. McCullough
BY Rodney Bedell
atty.

United States Patent Office 2,724,039
Patented Nov. 15, 1955

2,724,039

ELECTRIC HEATER STRUCTURE

Paul J. McCullough, St. Louis, Mo., assignor to The Toastwell Company, Inc., St. Louis, Mo., a corporation of Missouri Application May 3, 1952, Serial No. 285,865

9 Claims. (Cl. 219—19)

This invention relates in general to electric heating structure, such as may be used in electric toasters or similar apparatus.

The main object of this invention is to effect ready assembly and disassembly of a heater unit in a toaster or similar electric heater device.

It is another object to provide heater positioning means which incorporate stationary and movable members for conductive and stabilizing engagement therebetween of heater terminals, the members being relatively movable by operation of a single screw for engagement or release of the heater unit.

It is a further object to provide a toaster plate-like heater having adjacent terminals conductively connected to each end of the heater coil, which terminals are insulated from each other and cause current to flow from one to the other throughout the length of the coil when said contacts engage spaced circuit wires.

These and other detail objects as will appear from the description below are attained by the structure illustrated in the accompanying drawing, in which—

Figure 1 is a fragmentary vertical section through a toaster, and is taken transversely of a toasting compartment with a portion of a toasting compartment wall partially broken away.

Figure 2 is an elevation of a heater at one side of a toasting compartment.

Figure 3 is a fragmentary transverse section taken along line 3—3 of Figure 2.

Figure 4 is a side view of a heater terminal as shown in Figure 2 but drawn to a larger scale.

Figure 5 is a horizontal section taken along line 5—5 of Figure 4 but drawn to a larger scale.

Figure 6 is a detail view of the heater-positioning structure shown in Figure 1 with the heaters removed.

Figure 7 is a top view of the structure shown in Figure 6.

The toaster shown in the drawings has a casing preferably of light sheet metal with a continuous upright wall 1, a top wall 2 and a base plate 3. Within the casing are a pair of toasting compartments formed by a common front wall 4 and a common rear wall 5 and individual side walls formed by plate-like heaters 8.

The casing top wall has slots 7 for the passage therethrough of slices to and from compartment 6. At the rear end of each compartment 6, wall 5 has an upwardly extending tab 9 of less width than the distance between the associated heaters 8. Horizontal frames 10 are supported at their ends by walls 4, 5 and mount slice guide wires 10a.

Each heater 8 preferably comprises a pair of flat sheets 8a, 8b of dielectric material, such as mica, held assembled by metal retaining strips 12, 13 along their upper and lower margins respectively. Each lower retaining strip 13 projects at its ends beyond the mica and is loosely seated within upwardly opening V-shaped brackets 14 on base plate 3 adjacent front and rear plates 4, 5, respectively (Figure 3). Each upper retaining strip 12 projects only at its normally forward end beyond the forward margin of sheet 8b for support within an upwardly opening recess 15 in front plate 4.

Wound back and forth and around the mica sheets of each heater 8 in coil formation, is a continuous ribbon-like heating element 16 of electrical resistance material, such as Nichrome. The ends 17, 17' of element 16 are adjacent to each other near the upper rear corner of each heater 8, but are on opposite sides of the mica sheet 8b (Figure 5).

An elongated insulating strip 18 overlies each element end 17, 17' and extends a substantial distance beyond the margin of sheet 8a. Elongated contact bars 19, 20 overlie strips 18 and similarly extend beyond sheet 8a. Each of bars 19, 20 has an enlarged aperture filled with a porcelain-like washer 22. A washer 23 of mica overlies each washer 22. A metal washer 24 overlies each washer 23. A rivet 25 extends through sheet 8a and washers 22, 23 and 24 on bar 20 and connects the element-end 17 with bar 19. A rivet 26 extends through sheet 8a, and washers 22, 23 and 24 on bar 19, and connects the element-end 17' with bar 20. To more clearly illustrate the structure, strips 18 are shown spaced from sheet 8b and from each other, but it will be understood rivets 25 and 26 bring these parts together and form a rigid unit.

Current flowing through heaters 8 will follow a path from one contact bar through the resistance element 16 to the other contact bar. The various insulating strips and washers prevent by-passing of element 16, as between bars 19, 20 direct, so that energizing of all the heater elements will be assured.

Mounted on the inner face of casing wall 1 at the rear of each compartment 6 is a channel-shaped bracket with a web 32 and flanges 33, 34. The channel flanges project inwardly from wall 5 at the sides of tab 9 and provide stationary contacts for engagement with the outwardly presented contact bars 19, 20 of heaters 8. An insulation strip 35 is between bracket web 32 and wall 1. Extending laterally and outwardly from flange 34 is a lug 36, and secured to its under face by a screw 37 is an outturned lug 38 at the upper end of a conduit bar 39 which, at its lower end, is connected to a terminal 40 on the under side of base plate 3, for suitable connection to a current lead line (not shown).

Also affixed to wall 1 by rivets r between flanges 33, 34 is a mounting member or bracket 41 insulated from bracket 32 by dielectric section 42. Projecting forwardly from the lower portion of bracket 32 is a lug 43 connected on its under face by a screw 44 to a registering lug 45 at the upper end of a post 46, which is connected at its lower end to a terminal 47 depending from base plate 3 for connection to a second lead line (not shown).

Integral with bracket 41 is an upwardly opening or generally U-shaped member 48 (Figure 6) having relatively short flanges 49, 50 above the level of bracket flanges 33, 34. Each of flanges 49, 50 has a central upstanding tab 51 which projects through an aperture 52 (Figure 7) in the horizontal leg 53 of an angle-shaped clip 54. The inner end of each leg 53 loosely receives an adjustment screw 55 which is threaded into the web of channel member 48. The vertical leg 56 of each clip 54 opposes one of the flanges 33, 34 of bracket web 32 and cooperates therewith to clamp contact bar 19 or 20, as the case may be, of a heater 8 when the corresponding screw 55 is tightened. Thereby heaters 8 are firmly held in position within compartment 6 with contact bars 19, 20 in circuit closing relation between bracket 41 and brackets 32, 33, 34 which is connected to supply or lead lines. If brackets 41, 32, 33, 34 are in parallel circuit relation, clip 54 and flanges 33, 34 will be "hot" upon closure of a conventional main switch (not shown) so that current will flow through the path provided on heaters 8 as described above. Similarly, if brackets 41, 32, 33, 34 form part of a series circuit, the placement of heaters 8 between the clips 54 and flanges 33, 34 will make the circuit.

Loosening of adjustment screw 55 will remove pressure from horizontal leg 53 and allow same to be pivoted upwardly at its inner end responsive to downward and inward dropping of vertical leg 56 through gravity; whereby contact bars 19, 20 are released from clamping engagement, and heater 8 may be readily lifted from the toaster. Installation of a heater is as easily accomplished since, after the same has been restingly positioned in the brackets 14 and recess 15, tightening of adjustment screws 55 will cause the contact bars 19, 20 to be firmly gripped, as described above. The heads of adjustment screws 55 are adjacent the top of the toaster so that upon removal of closure 2 the screws are readily accessible. Heaters 8 are independent of each other without any direct interconnection between them, so that removal of one heater from the toaster will not affect the other heater, such as requiring its detachment or removal.

The removal from and installation of heaters 8 is a simple procedure which obviates the involvel methods required in earlier electric toasters, wherein it is necessary to have access to the lower portions of the heaters.

The details of construction may be varied substantially without departing from the spirit of the invention and the exclusive use of those modifications coming within the scope of the claims is contemplated.

What is claimed is:

1. In an electrical device, a heater comprising a plate of dielectric material, a heating coil wound about said plate, the ends of said coil being positioned on opposite sides of said plate and both being adjacent one side margin of the plate, contact bars disposed on opposite sides of said plate in the vicinity of the coil ends, and individual members securing said bars to said plate, one of said coil ends being conductively connected to one of said members and the other of said coil ends conductively connected to the other of said members, said first-mentioned member being in conductive contact with one of said bars and said second member being in conductive contact with the other of said bars, both of said bars projecting beyond the said side margin of the plate, means for electrically insulating the member and bar associated with one coil end from the member and bar associated with the other coil end, said means comprising flat insulating members disposed between each bar and the plate, said insulating members projecting beyond the related bar.

2. In an electric toaster having a housing, a supply circuit and a plate-like heater including a resistance coil said coil having terminals at its opposite ends arranged side by side but insulated from each other, a conductive member fixedly mounted in said housing, another conductive member movably mounted in opposed relation to said fixed member for cooperative clamp-forming relation therewith, a single adjusting device mounted in the toaster and operatively engaged to said movable member for moving the same toward said fixed member, for clamping both of said terminals between them, and away from said fixed member for releasing said terminals from clamping engagement therebetween, each of said members being connected to said supply circuit, and insulating means preventing current flow between said members except through said resistance.

3. In an electric toaster having a supply circuit and a plate-like heater, a heater positioning device comprising first and second brackets fixedly mounted in said toaster and each being connected to the supply circuit, insulating means disposed between said first and second brackets to prevent unauthorized current flow therebetween, a conductive clip pivoted on said second bracket in opposed relation to said first bracket for clamp-forming relation therewith, and adjusting means associated with said clip for optionally rocking the same toward said first bracket for clamping engagement therebetween of a heater for circuit-closure, or away from said first bracket for release of a heater from engagement therebetween and circuit breaking.

4. In an electric toaster having a supply circuit and a plate-like heater, a heater positioning device comprising first and second brackets fixedly mounted in said toaster in the upper portion thereof, each of said brackets being connected to the supply circuit, insulating means disposed between said first and second brackets to prevent unauthorized current flow therebetween, a conductive clip rockably mounted on said second bracket and having an inner and an outer leg, said outer leg being disposed beyond said second bracket in opposed relation to said first bracket for clamping relation therewith, and an adjusting member engaging said second bracket and the clip inner leg for optional rocking of said clip to cause said outer leg to be moved toward the first bracket for clamping engagement therebetween of a heater for circuit-closure, or to be moved away from the first bracket for release of a heater from engagement therebetween and for circuit-breaking.

5. In an electric toaster having a supply circuit and a plate-like heater, a heater positioning device comprising first and second brackets fixedly mounted in said toaster in the upper portion thereof, each of said brackets being connected to the supply circuit, said second bracket being disposed in elevated relation to said first bracket, insulating means disposed between said first and second brackets to prevent unauthorized current flow therebetween, a conductive clip pivoted on said second bracket and having inner and outer legs in axially normal relation, said outer leg being disposed outwardly of said second bracket for downward extension to present its lower end in clamp-forming relation with said first bracket, an adjustment screw engaging the clip inner end and the second bracket for upward and downward threading to permit pivoting of said clip to optionally cause the outer leg to be moved towards said first bracket, for clamping engagement of a heater therebetween and circuit-closure, or to be moved away from said first bracket for release of a heater from engagement therebetween and circuit-breaking, and detent means for preventing displacement of said clip with reference to said second bracket.

6. In an electric toaster having a supply circuit, the combination with a plate-like heater comprising a sheet of insulating material, a heating coil wound about said sheet, the ends of said coil being positioned on opposite sides of said heater, a contact bar connected to each end of the coil and mounted on said heater on the same side thereof as its associated coil end, said contact bars being disposed in planar relation to each other and to the insulating sheet, said contact bars projecting beyond said sheet and insulating means between said projecting portions of said contacting bars, of a heater positioning device comprising first and second conductive members mounted in the toaster in opposed relation for receiving the heater contact bars therebetween, said first conductive member being fixed and said second conductive member being mounted for movement toward and away from said first member, said conductive members being insulated from each other and being each connected to the supply circuit, and adjusting means associated with said second conductive members for optional relative movement of said members toward each other for clamping engagement of the contact bars therebetween, whereby upon circuit closure, current will flow through one of said conductive members to the abutting contact bar, thence through the coil for energizing the heater, then through the other contact bar and the other conductive member.

7. In an electric toaster having a supply circuit, the combination with a plate-like heater comprising a sheet of insulating material, a heating coil wound about said sheet, the ends of said coil being proximate the same side margin of the sheet and on opposite sides thereof, a contact bar connected to each coil end and projecting beyond the said side margin of the sheet in aligned, parallel relation, insulating means disposed between each contact bar and said sheet of a heater-positioning device comprising first and second brackets fixedly mounted in said toaster and each being connected to the supply circuit, insulating means disposed between said first and second brackets to prevent unauthorized current flow therebetween, a conductive clip pivoted on said second bracket in opposed relation to said first bracket for clamp-forming relation therewith, and adjusting means associated with said clip for optionally rocking the same toward said first bracket for clamping engagement therebetween of the heater contact bars whereby, upon circuit closure, current will flow through one of said conductive members to the abutting contact bar, thence through the coil for energizing the heater, then through the other contact bar and the other conductive member.

8. In an electric toaster having a supply circuit, the combination with a plate-like heater comprising a sheet of insulating material, a heating coil wound about said sheet, the ends of said coil being proximate the same side margin of the sheet and on opposite sides thereof, a contact bar connected to each coil end and projecting beyond the said side margin of the sheet in aligned, parallel relation, insulating means disposed between each contact bar and said sheet of a heater-positioning device comprising first and second brackets fixedly mounted in said toaster in the upper portion thereof, each of said brackets being connected to the supply circuit, insulating means disposed between said first and second brackets to prevent unauthorized current flow therebetween, a conductive clip rockably mounted on said second bracket and having an inner and an outer leg, said outer leg being disposed beyond said second bracket in opposed relation to said first bracket for clamp-forming relation therewith, and an adjusting member engaging said second bracket and the clip inner leg for optional rocking of said clip to cause said outer leg to be moved toward the first bracket for clamping engagement therebetween of the heater contact bars whereby, upon circuit closure, current will flow through one of said conductive members to the abutting contact bar, thence through the coil for energizing the heater, then through the other contact bar and the other conductive member.

9. In an electrical device, a heater as described in claim 1 wherein the individual members for securing the bars to the plate are rivets which extend through aligned apertures in the contact bars and sheet, the aperture in one contact bar being greater than the aligned aperture in the other, and a dielectric member disposed encirclingly about the rivet within the larger aperture.

References Cited in the file of this patent
UNITED STATES PATENTS

| | | |
|---|---|---|
| 1,102,393 | Denhard | July 7, 1914 |
| 1,552,337 | Mottlau | Sept. 1, 1925 |
| 1,836,538 | Lofgren et al. | Dec. 15, 1931 |
| 2,012,788 | Ireland | Aug. 27, 1935 |
| 2,194,848 | Collins | Mar. 26, 1940 |
| 2,253,637 | McCullough | Aug. 26, 1941 |
| 2,503,959 | McCullough | Apr. 11, 1950 |